(12) United States Patent
Chen et al.

(10) Patent No.: US 10,755,075 B2
(45) Date of Patent: Aug. 25, 2020

(54) FINGERPRINT RECOGNITION APPARATUS AND MANUFACTURING METHOD THEREFOR, MOBILE TERMINAL, AND FINGERPRINT LOCK

(71) Applicants: Semiconductor Manufacturing International (Beijing) Corporation, Beijing (CN); Semiconductor Manufacturing International (Shanghai) Corporation, Shanghai (CN)

(72) Inventors: Wenlei Chen, Shanghai (CN); Qifeng Wang, Shanghai (CN)

(73) Assignees: Semiconductor Manufacturing (Beijing) International Corporation, Beijing (CN); Semiconductor Manufacturing (Shanghai) International Corporation, Shanghai (CN)

( * ) Notice: Subject to any disclaimer, the term of this patent is extended or adjusted under 35 U.S.C. 154(b) by 95 days.

(21) Appl. No.: 16/106,604

(22) Filed: Aug. 21, 2018

(65) Prior Publication Data
US 2019/0180079 A1   Jun. 13, 2019

(30) Foreign Application Priority Data
Dec. 12, 2017   (CN) .......................... 2017 1 1316151

(51) Int. Cl.
*G06K 9/00* (2006.01)
*G06F 1/3234* (2019.01)
*G06F 21/32* (2013.01)
*G06F 3/044* (2006.01)

(52) U.S. Cl.
CPC ....... *G06K 9/00087* (2013.01); *G06F 1/3234* (2013.01); *G06F 3/044* (2013.01); *G06F 21/32* (2013.01); *G06K 9/0002* (2013.01); *G06K 9/00053* (2013.01)

(58) Field of Classification Search
CPC ............. G06K 9/00087; G06K 9/0002; G06K 9/00053; G06F 3/044; G06F 1/3234; G06F 21/32
See application file for complete search history.

(56) References Cited

U.S. PATENT DOCUMENTS

| | | | | |
|---|---|---|---|---|
| 2008/0157787 | A1* | 7/2008 | Misra ................... | G06K 9/0002 324/686 |
| 2012/0194464 | A1* | 8/2012 | Liu ....................... | G06F 3/0412 345/173 |
| 2016/0278671 | A1* | 9/2016 | Bhagavat ............. | A61B 5/1172 |
| 2017/0092622 | A1* | 3/2017 | Wu ......................... | H01L 24/82 |

* cited by examiner

*Primary Examiner* — John B Strege
(74) *Attorney, Agent, or Firm* — Brinks Gilson & Lione (57) ABSTRACT

The present disclosure relates to the field of fingerprint recognition technologies, and provides a fingerprint recognition apparatus and a manufacturing method therefor, a mobile terminal, and a fingerprint lock. The apparatus includes: a substrate defining a protrusion on a surface of the substrate; a fingerprint chip, including: a signal processing circuit connected to the protrusion by passing through a TSV structure, a plurality of sensing electrodes connected to the signal processing circuit, and a protection layer covering the plurality of sensing electrodes; and a touch cover plate located on the protection layer.

16 Claims, 12 Drawing Sheets

FIG. 6F

FINGERPRINT RECOGNITION APPARATUS AND MANUFACTURING METHOD THEREFOR, MOBILE TERMINAL, AND FINGERPRINT LOCK

RELATED APPLICATIONS

The present application claims priority to Chinese Patent Appln. No. 201711316151.8, filed Dec. 12, 2017, the entire disclosure of which is hereby incorporated by reference.

BACKGROUND

Technical Field

The present disclosure relates to the field of fingerprint recognition technologies, and in particular, to a fingerprint recognition apparatus and a manufacturing method therefor, a mobile terminal, and a fingerprint lock.

Related Art

With the development of mobile terminals, a fingerprint recognition function is gradually becoming a standard configuration for a mobile terminal. Currently, fingerprint recognition is predominately implemented using capacitance recognition.

Using mobile phones as an example, mobile phones are developing towards having full screens, and a fingerprint chip needs to be disposed below the display screen. However, because a relatively thick packaging material layer is required for packaging the fingerprint chip, and the display screen is relatively thick, a distance between a finger and the fingerprint chip is increased. Consequently, sensitivity of the fingerprint chip is lowered.

SUMMARY

An objective of the present disclosure is to improve sensitivity of a fingerprint chip.

In one aspect of the present disclosure, a fingerprint recognition apparatus is provided. The fingerprint recognition apparatus may include: a substrate defining a protrusion on a surface of the substrate; a fingerprint chip, including: a signal processing circuit connected to the protrusion by passing through a through substrate via (TSV) structure, a plurality of sensing electrodes connected to the signal processing circuit, and a protection layer covering the plurality of sensing electrodes; and a touch cover plate located on the protection layer.

In some implementations, the protection layer has a first opening extending to each sensing electrode; and the apparatus further includes: a conductive material filling the first opening, where the touch cover plate is located on the conductive material.

In some implementations, the apparatus further includes: a buffer layer located on the protection layer, where there is a second opening extending from a surface of the buffer layer to each sensing electrode; and a conductive material filling the second opening, where the touch cover plate is located on the conductive material.

In some implementations, the conductive material includes a soft conductive material.

In some implementations, the soft conductive material includes graphite or a conductive silver paste.

In some implementations, the buffer layer includes an organic polymer.

In another aspect of the present disclosure, a mobile terminal is provided. The mobile terminal may include: the fingerprint recognition apparatus according to any one of the foregoing embodiments or implementations.

In yet another aspect of the present disclosure, a fingerprint lock is provided. The fingerprint lock may include: the fingerprint recognition apparatus according to any one of the foregoing embodiments.

In a further aspect of the present disclosure, a method for manufacturing a fingerprint recognition apparatus is provided. The method may include: forming a protrusion on a surface of a substrate; forming a fingerprint chip, where the fingerprint chip includes: a signal processing circuit connected to the protrusion by passing through a TSV structure, a plurality of sensing electrodes connected to the signal processing circuit, and a protection layer covering the plurality of sensing electrodes; and forming a touch cover plate on the protection layer.

In some implementations, the protection layer has a first opening extending to each sensing electrode; and the method further includes: before forming a touch cover plate on the protection layer, forming a conductive material filling the first opening, where the touch cover plate is formed on the conductive material.

In some implementations, the protection layer has a first opening extending to each sensing electrode; and the forming a touch cover plate on the protection layer includes: forming a buffer layer filling the first opening on the protection layer; forming a second opening extending from a surface of the buffer layer to each sensing electrode; forming a conductive material filling the second opening; and forming the touch cover plate on the conductive material.

In some implementations, the second opening is in alignment with the first opening.

In some implementations, forming a touch cover plate on the protection layer includes: forming a buffer layer on the protection layer; forming an opening extending from a surface of the buffer layer to each sensing electrode; forming a conductive material filling the opening; and forming the touch cover plate on the conductive material.

In some implementations, the conductive material includes a soft conductive material.

In some implementations, the soft conductive material includes graphite or a conductive silver paste.

In some implementations, the buffer layer includes an organic polymer.

In embodiments and implementations of the present disclosure, a signal processing circuit in a fingerprint chip is connected to a protrusion on a substrate by passing through the TSV structure, so that an electrical signal may be applied to the fingerprint chip using the protrusion. In addition, the touch cover plate may have a function of packaging the fingerprint chip. Therefore, there is no need to form a packaging layer on the protection layer of the fingerprint chip, and further, there is no need to form a pin on the packaging layer. As a result, a thickness of the fingerprint chip is reduced, and a distance between a finger and the sensing electrodes is reduced, thereby improving sensitivity of the fingerprint chip.

According to the following detailed description of exemplary embodiments and implementations of the present disclosure with reference to the accompanying drawings, other features, aspects, and advantages of the present disclosure become clear.

BRIEF DESCRIPTION OF THE DRAWINGS

The accompanying drawings constituting a part of this specification describe exemplary embodiments and implementations of the present disclosure, and are used to explain the principles of the present disclosure in combination with this specification. In the figures:

FIG. 3A to FIG. 3C are schematic diagrams of stages of one form of a method for manufacturing a fingerprint recognition apparatus;

FIG. 4A to FIG. 4D are schematic diagrams of stages of another form of a method for manufacturing a fingerprint recognition apparatus;

FIG. 5A to FIG. 5F are schematic diagrams of stages of yet another form of a method for manufacturing a fingerprint recognition apparatus; and FIG. 6A to FIG. 6F are schematic diagrams of stages of a further form of a method for manufacturing a fingerprint recognition apparatus.

DETAILED DESCRIPTION

Exemplary embodiments and implementations of the present disclosure are described below in detail with reference to the accompanying drawings. It should be understood that, unless otherwise specified, relative deployment of components and steps, numerical expressions, and values illustrated in the embodiments and implementations should not be understood as limitations to the scope of the present disclosure.

In addition, it should be understood that, for ease of description, sizes of components shown in the accompanying drawings are not necessarily drawn according to an actual proportional relationship. For example, thicknesses or widths of some layers may be enlarged relative to other layers.

The following descriptions of the exemplary embodiments and implementations are merely used for illustration, and should not be interpreted as a limitation to the present disclosure and application and or use thereof.

Technologies, methods, and apparatuses that are known by persons of ordinary skill in the related art may not be discussed in detail. However, when the technologies, methods, and apparatuses are applicable, the technologies, methods, and apparatuses should be considered as a part of this specification.

It should be noted that, similar reference signs and letters represent similar items in the following accompanying drawings. Therefore, once an item is defined or described in an accompanying drawing, the item does not need to be further discussed in descriptions of subsequent accompanying drawings.

Figure 1A:
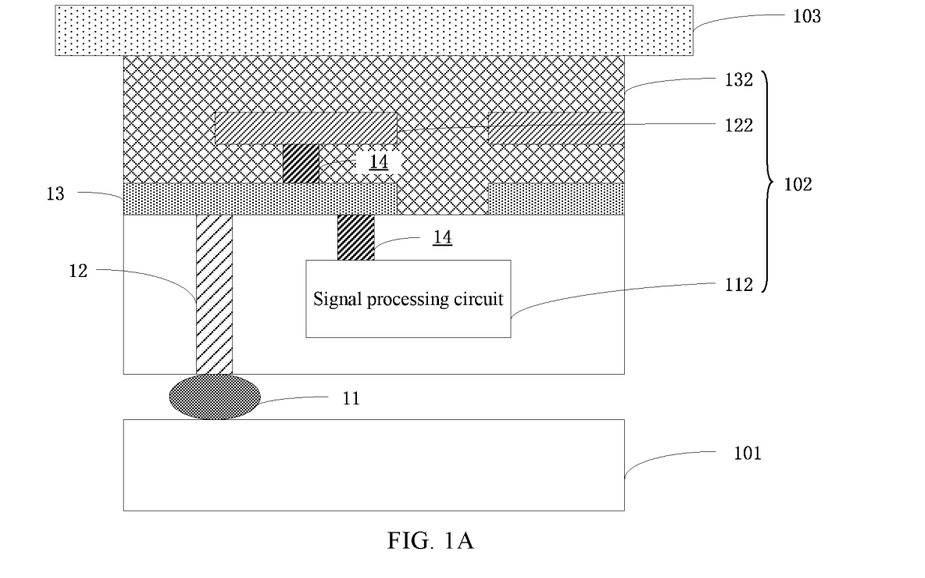
FIG. 1A is a schematic structural diagram of one form of a fingerprint recognition apparatus.

FIG. 1A is a schematic structural diagram of one form of a fingerprint recognition apparatus.

As shown in FIG. 1A, the fingerprint recognition apparatus includes: a substrate 101, a fingerprint chip 102, and a touch cover plate 103.

There is a protrusion 11 on a surface of the substrate 101. In some implementations, the protrusion 11 may be ball-shaped, for example, a copper ball or a gold ball.

The fingerprint chip 102 may include: a signal processing circuit 112, a plurality of sensing electrodes 122 connected to the signal processing circuit 112, and a protection layer 132 covering the plurality of sensing electrodes 122. In some implementations, the signal processing circuit 112 is connected to the protrusion 11 by passing through a TSV structure 12. For example, the TSV structure 12 is connected to a metal layer 13, the signal processing circuit 112 may be connected to the metal layer 13 through a conductive plug 14, and the sensing electrodes 122 may be connected to the metal layer 13 through the conductive plug 14. The sensing electrodes 122 can sense a finger touch, and sensing capacitance is formed between the finger and the sensing electrodes. The signal processing circuit 112 can process a sensing capacitance signal, for example, amplify the sensing capacitance signal. In some implementations, the signal processing circuit 112 may be a digital signal processor (DSP).

The protection layer 132 may be, for example, an insulation material such as a silicon oxide or a silicon nitride. Further the protection layer 132 may be configured to protect the sensing electrodes 122, the metal layer 13, the conductive plug 14, and the like. In some implementations, the touch cover plate 103 may be a glass plate, a sapphire plate, or the like. In some other implementations, the touch cover plate 103 may include a display panel, for example, an organic light emitting diode (OLED) panel or a liquid crystal display panel.

In foregoing implementations, the signal processing circuit in the fingerprint chip is connected to the protrusion on the substrate through the TSV structure, so that an electrical signal may be applied to the fingerprint chip by using the protrusion. In addition, the touch cover plate may have a function of packaging the fingerprint chip. Therefore, there is no need to form a packaging layer on the protection layer of the fingerprint chip, and further, there is no need to form a pin on the packaging layer. As a result, a thickness of the fingerprint chip is reduced, and a distance between a finger and the sensing electrodes is reduced, thereby improving sensitivity of the fingerprint chip.

Figure 1B:
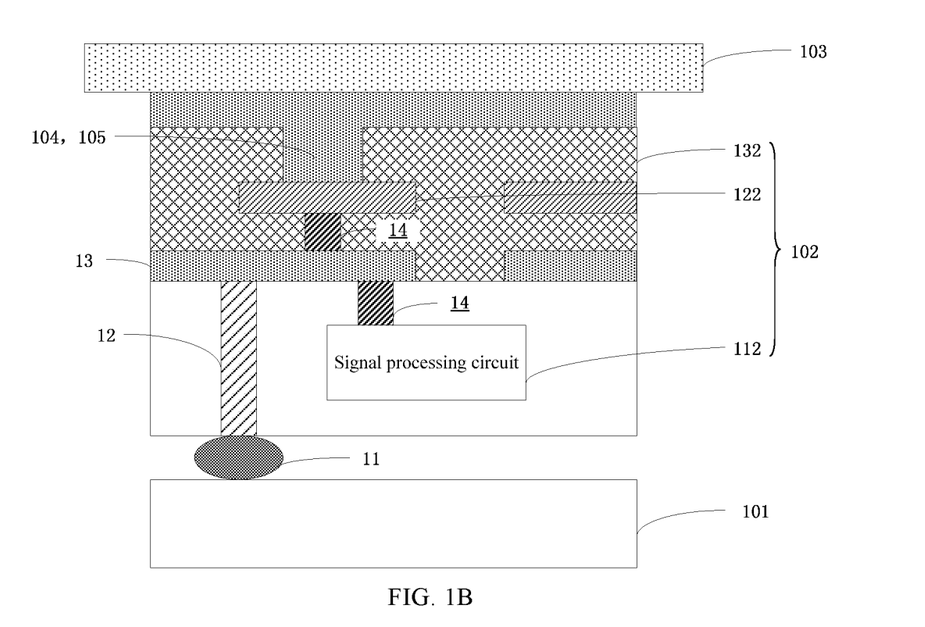
FIG. 1B is a schematic structural diagram of another form of a fingerprint recognition apparatus.

FIG. 1B is a schematic structural diagram of another form of a fingerprint recognition apparatus.

Only differences between the form shown in FIG. 1B and the form shown in FIG. 1A are emphasized below. For other same or similar aspects, refer to the foregoing descriptions.

Compared with the form shown in FIG. 1A, in the fingerprint recognition apparatus shown in FIG. 1B, the protection layer 132 has a first opening 104 extending to each sensing electrode 122. The fingerprint recognition apparatus further includes a conductive material 105 filling the first opening 104. Correspondingly, the touch cover plate 103 is located on the conductive material 105. In some implementations, the conductive material 105 may include a soft conductive material, for example, graphite or a conductive silver paste. The soft conductive material may protect the fingerprint chip against mechanical damage.

It should be understood that, although FIG. 1B shows the first opening 104 and the conductive material 105 at a same position, it does not necessarily indicate that the conductive material 105 fills only the first opening 104. In some implementations, the conductive material 105 may alternatively be formed on the protection layer 132.

In foregoing implementations, the conductive material is formed between the touch cover plate and the sensing electrodes. Because the conductive material is closer to the touch cover plate than the sensing electrodes, when a finger is in contact with the touch cover plate, capacitance between the finger and the sensing electrodes increases, thereby further improving sensitivity of the fingerprint chip.

Figure 1C:
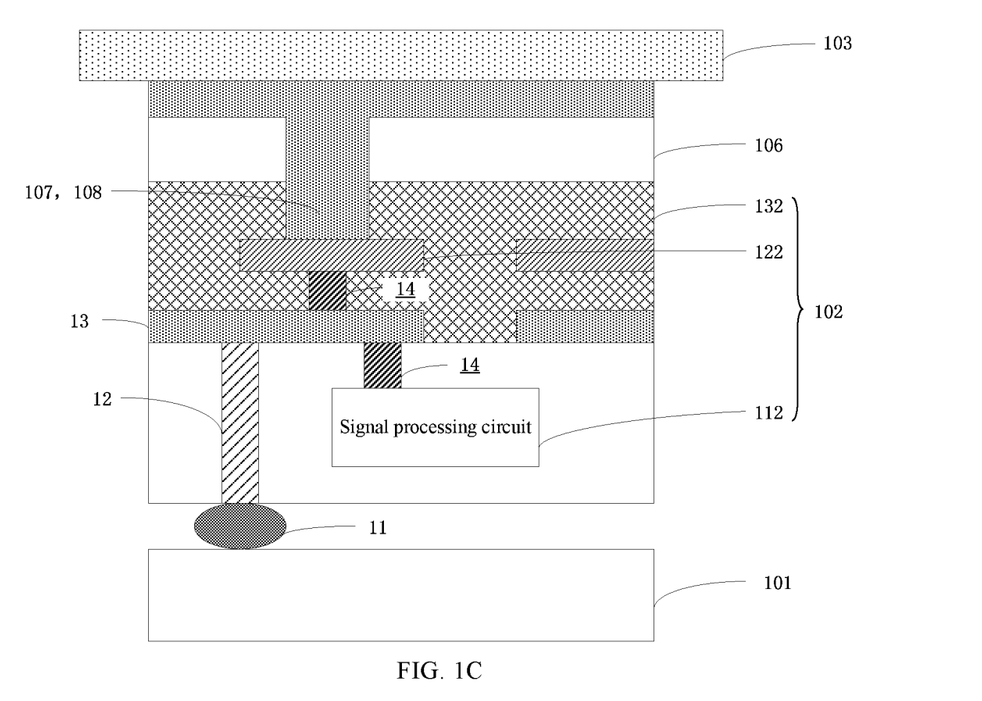
FIG. 1C is a schematic structural diagram of yet another form of a fingerprint recognition apparatus.

FIG. 1C is a schematic structural diagram of another form of a fingerprint recognition apparatus.

Only differences between the form shown in FIG. 1C and the forms shown in FIG. 1A and FIG. 1B are emphasized below. For other same or similar aspects, refer to the foregoing descriptions.

Compared with the form shown in FIG. 1B, the fingerprint recognition apparatus shown in FIG. 1C further includes a buffer layer 106 located on the protection layer 132. The buffer layer 106 may include an organic polymer, for example, polyimide resin.

There is an opening 107 extending from a surface of the buffer layer 106 to each sensing electrode 122, and the opening 107 is filled with a conductive material 108. Correspondingly, the touch cover plate 103 is located on the conductive material 108.

In foregoing implementations, the conductive material is formed between the touch cover plate and the sensing electrodes, and the buffer layer is disposed between the touch cover plate and the protection layer, thereby reducing mechanical damage to the fingerprint chip while further improving sensitivity of the fingerprint chip.

Fingerprint recognition apparatus provided in the embodiments and implementations of the present disclosure may be applied to a mobile terminal or a fingerprint lock.

The present disclosure further provides a mobile terminal, which may include: the fingerprint recognition apparatus according to any one of the foregoing embodiments or implementations.

The present disclosure further provides a fingerprint lock, which may include: the fingerprint recognition apparatus according to any one of the foregoing embodiments or implementations.

Forms of a method for manufacturing the fingerprint recognition apparatus shown in FIG. 1A, FIG. 1B, and FIG. 1C are described below with reference to different forms and implementations.

It should be noted that, in the following descriptions, mutual reference may be made between same steps in different forms and implementations.

Figure 2:
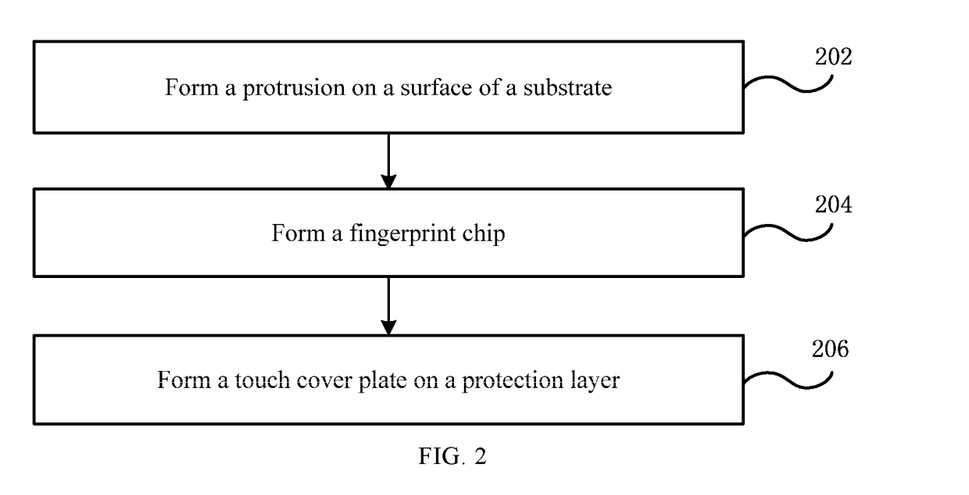
FIG. 2 is a simplified flowchart of a method for manufacturing a fingerprint recognition apparatus.
Figure 3A:
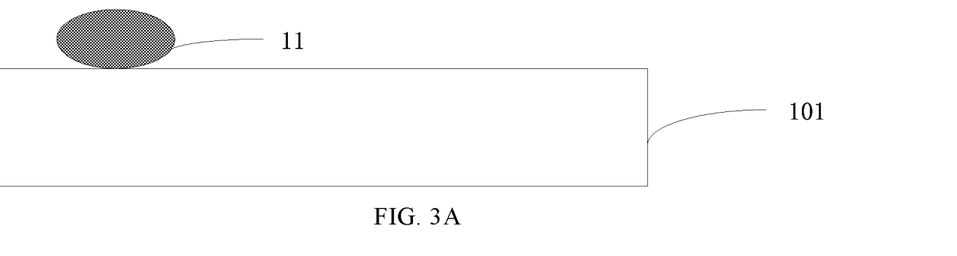
Figure 3B:
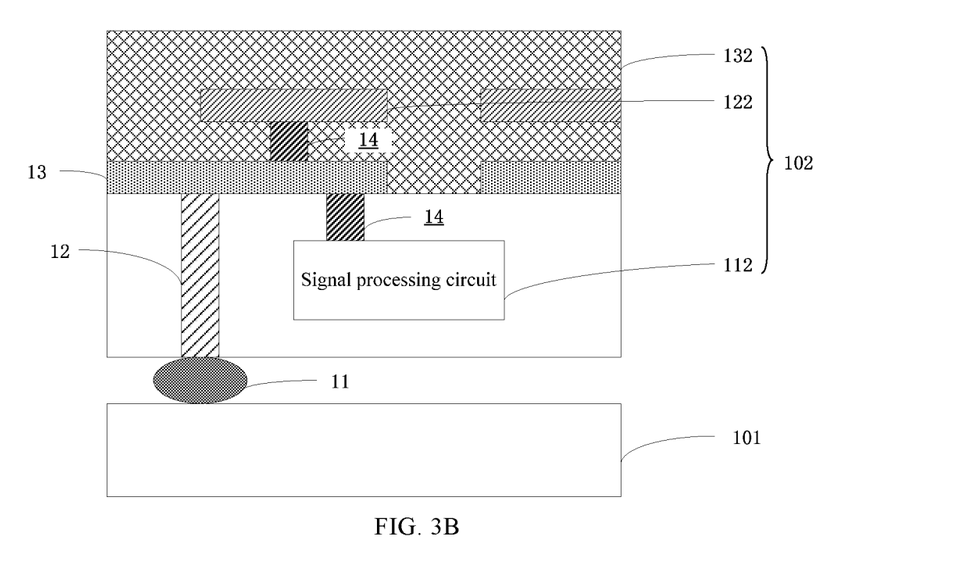
Figure 3C:
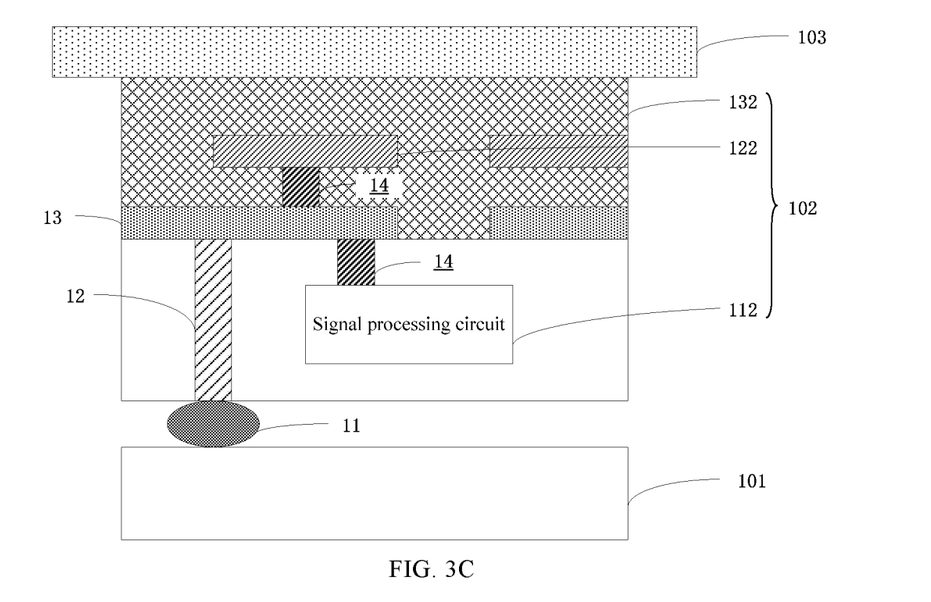

FIG. 2 is a simplified flowchart of one form of a method for manufacturing a fingerprint recognition apparatus such as those described in the present disclosure. FIG. 3A to FIG. 3C are schematic diagrams of stages of one form of a method for manufacturing a fingerprint recognition apparatus such as those described in the present disclosure.

One form of a method for manufacturing the fingerprint recognition apparatus are described below in detail with reference to FIG. 1, and FIG. 3A to FIG. 3C.

As shown in FIG. 1, first, in step 202, the protrusion 11 is formed on the surface of the substrate 101, as shown in FIG. 3A. For example, a metal ball formed by means of a ball mount process or the like on the surface of the packaging substrate 101 may be used as the protrusion 11.

In step 204, the fingerprint chip 102 is formed, as shown in FIG. 3B. The formed fingerprint chip 102 includes: the signal processing circuit 112 connected to the protrusion 11 through the TSV structure 12, the plurality of sensing electrodes 122 connected to the signal processing circuit 112, and the protection layer 132 covering the plurality of sensing electrodes 122.

In step 206, the touch cover plate 103 is formed on the protection layer 132, for example, a glass plate, as shown in FIG. 3C.

In foregoing implementations, the fingerprint recognition apparatus shown in FIG. 1A may be formed. The signal processing circuit in the fingerprint chip is connected to the protrusion on the substrate through the TSV structure, so that an electrical signal may be applied to the fingerprint chip by using the protrusion. In addition, the touch cover plate may have a function of packaging the fingerprint chip. Therefore, there is no need to form a packaging layer on the protection layer of the fingerprint chip, and further, there is no need to form a pin on the packaging layer. As a result, a thickness of the fingerprint chip is reduced, and a distance between a finger and the sensing electrodes is reduced, thereby improving sensitivity of the fingerprint chip.

FIG. 4A to FIG. 4D are schematic diagrams of stages of another form of a method for manufacturing a fingerprint recognition apparatus.

Figure 4A:
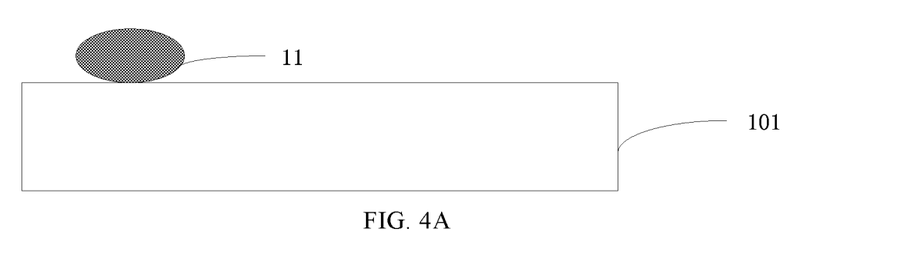

As shown in FIG. 4A, a protrusion 11 is formed on a surface of a substrate 101.

Figure 4B:
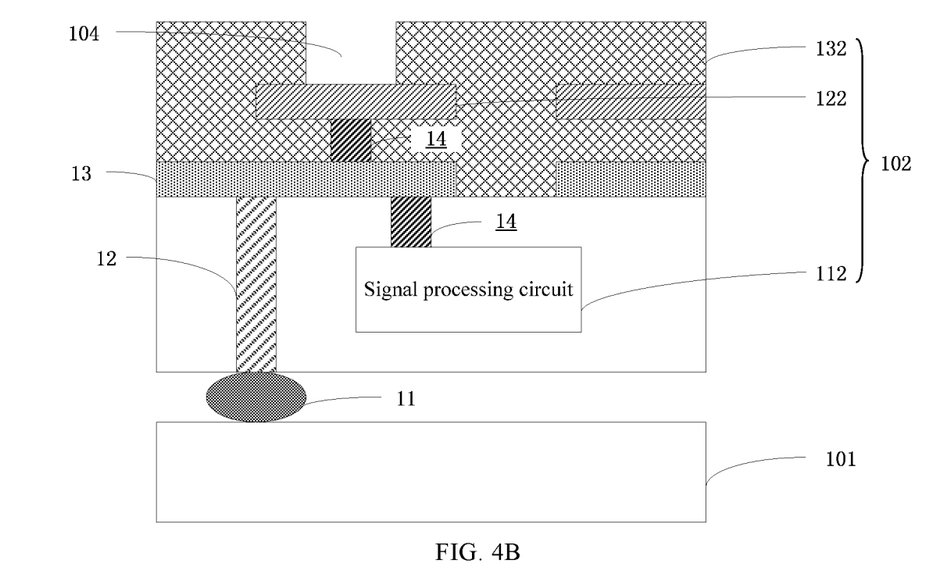

As shown in FIG. 4B, a fingerprint chip 102 is formed. The fingerprint chip 102 includes: a signal processing circuit 112 connected to the protrusion 11 through a TSV structure 12, a plurality of sensing electrodes 122 connected to the signal processing circuit 112, and a protection layer 132 covering the plurality of sensing electrodes 122. Herein, the protection layer 132 has a first opening 104 extending to each sensing electrode 122.

Figure 4C:
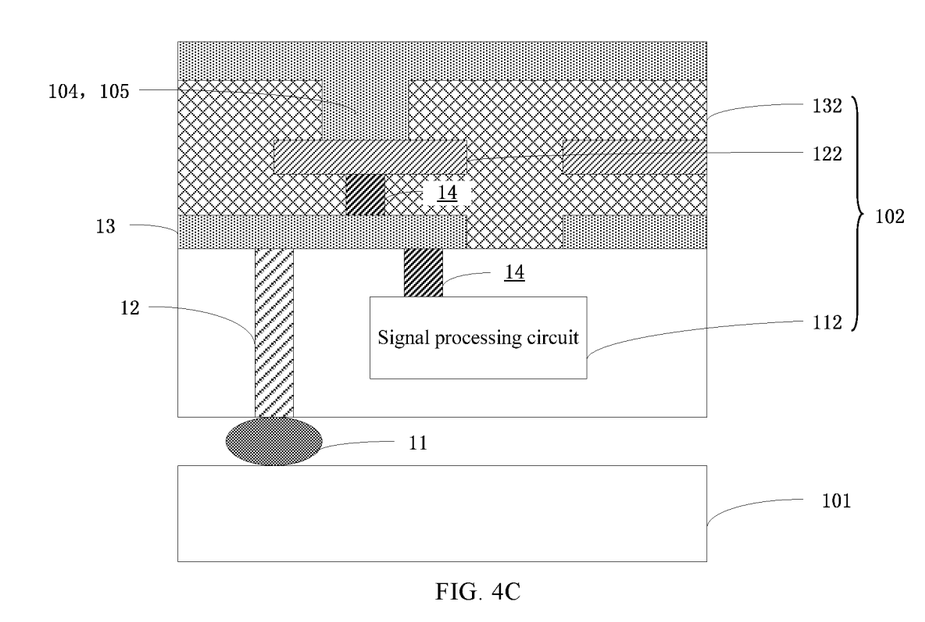

As shown in FIG. 4C, a conductive material 105 filling the first opening 104 is formed. For example, the conductive material 105 may include a soft conductive material. The soft conductive material may include graphite or a conductive silver paste. It should be understood that, the conductive material 105 is not limited to filling the first opening 104, and may alternatively be formed on the protection layer 132.

Figure 4D:
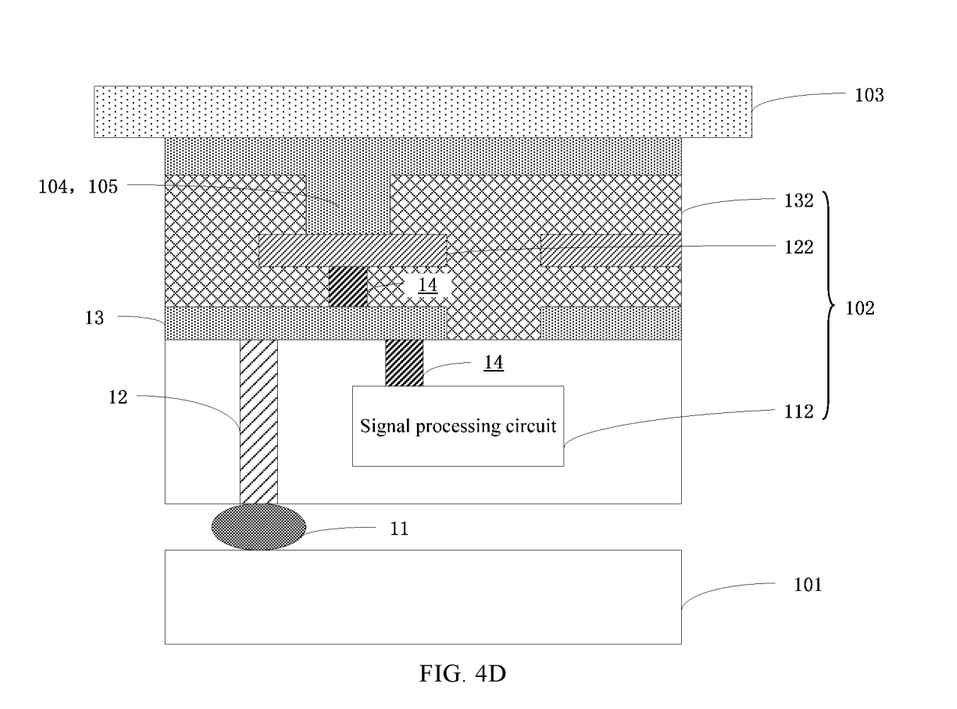

As shown in FIG. 4D, a touch cover plate 103 is formed on the protection layer 132. The touch cover plate herein is formed on the conductive material 105.

According to foregoing implementations, the fingerprint recognition apparatus shown in FIG. 1B may be formed. The conductive material is formed between the touch cover plate and the sensing electrodes. Because the conductive material is closer to the touch cover plate than the sensing electrodes, when a finger is in contact with the touch cover plate, capacitance between the finger and the sensing electrodes increases, thereby further improving sensitivity of the fingerprint chip.

FIG. 5A to FIG. 5F are schematic diagrams of stages of another form of a method for manufacturing a fingerprint recognition apparatus.

Figure 5A:
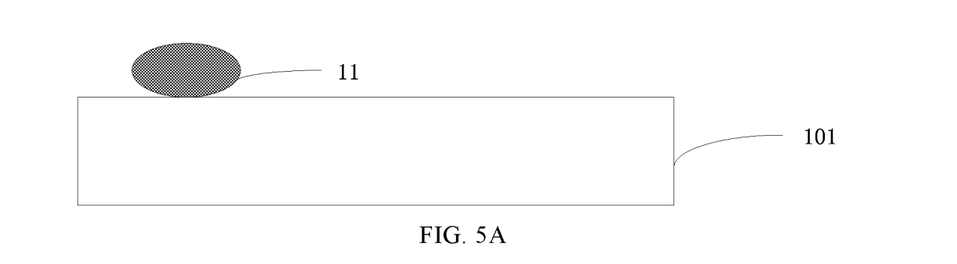

As shown in FIG. 5A, a protrusion 11 is formed on a surface of a substrate 101.

Figure 5B:
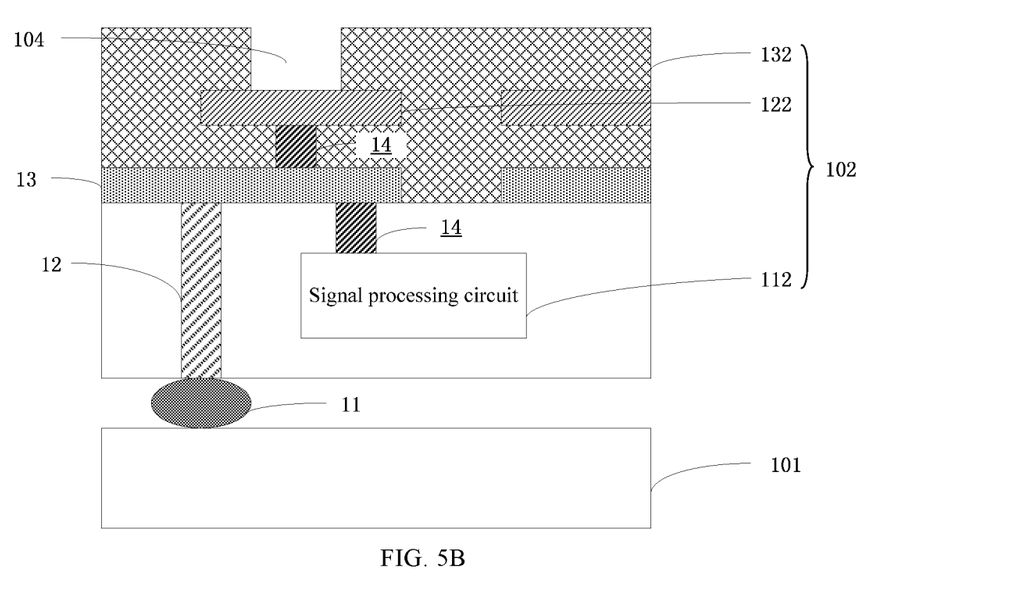

As shown in FIG. 5B, a fingerprint chip 102 is formed. The fingerprint chip 102 includes: a signal processing circuit 112 connected to the protrusion 11 through a TSV structure 12, a plurality of sensing electrodes 122 connected to the signal processing circuit 112, and a protection layer 132 covering the plurality of sensing electrodes 122. Herein, the protection layer 132 has a first opening 104 extending to each sensing electrode 122.

Figure 5C:
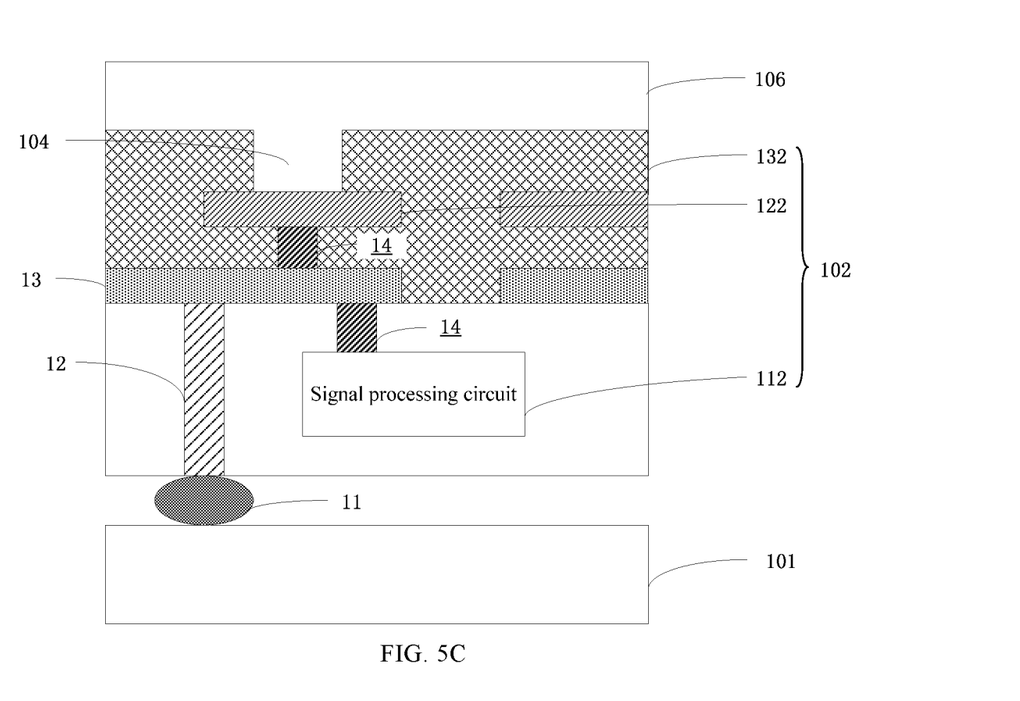

As shown in FIG. 5C, a buffer layer 106 filling the first opening 104 is formed on the protection layer 132. For example, the buffer layer 106 may include an organic polymer, for example, resin.

Figure 5D:
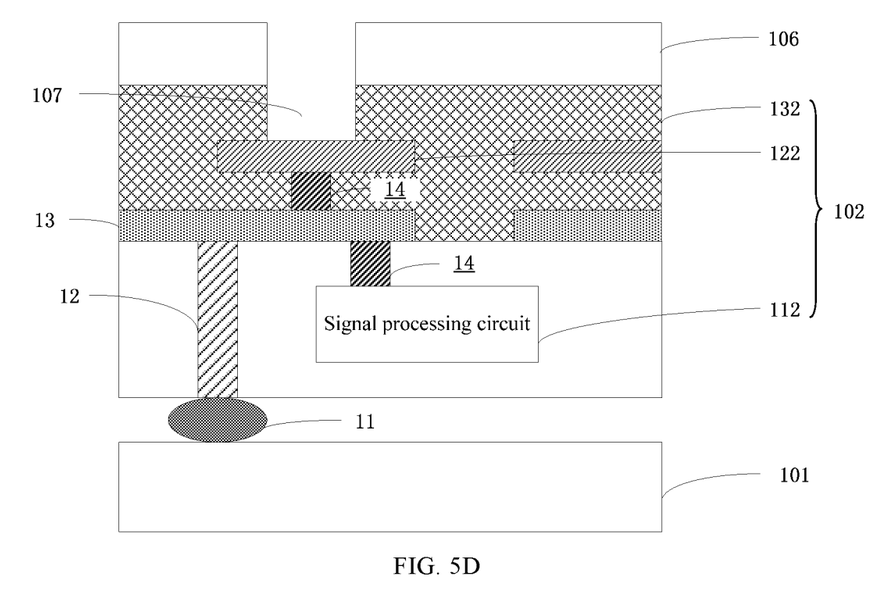

As shown in FIG. 5D, a second opening 107 extending from a surface of the buffer layer 106 to each sensing electrode 122 is formed.

In some implementations, the second opening 107 may be substantially in alignment with the first opening 104. That is, in a top view, the second opening 107 and the first opening 104 may substantially overlap such that the first opening 104 may be used as a lower half part of the second opening 107.

However, it should be understood that, the present disclosure is not limited thereto. In other implementations, in a top view, the size of the second opening 107 may be larger than that of the first opening 104, or the size of the second opening 107 may be smaller than that of the first opening 104.

Figure 5E:
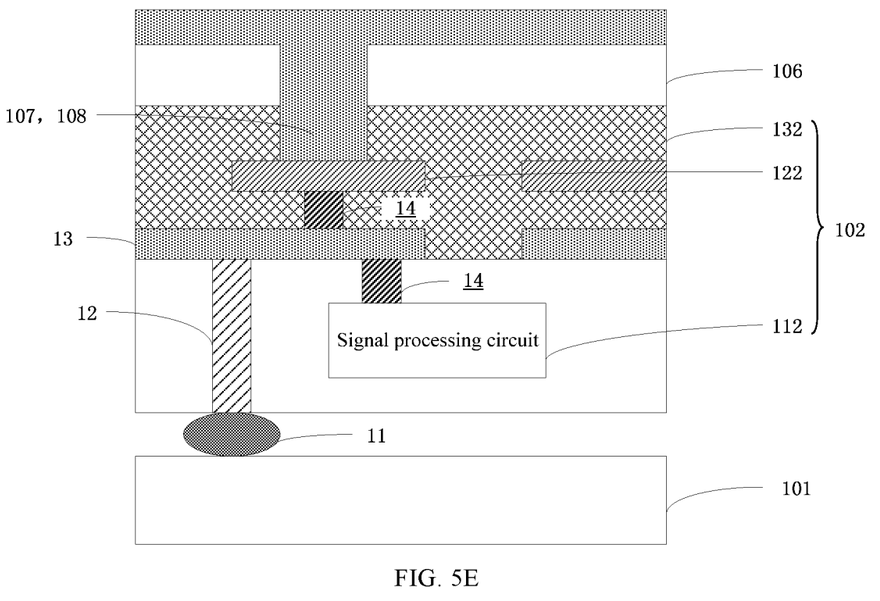

As shown in FIG. 5E, a conductive material 108 filling the second opening 107 is formed. Similarly, the conductive material 108 may alternatively be formed on the buffer layer 106.

Figure 5F:
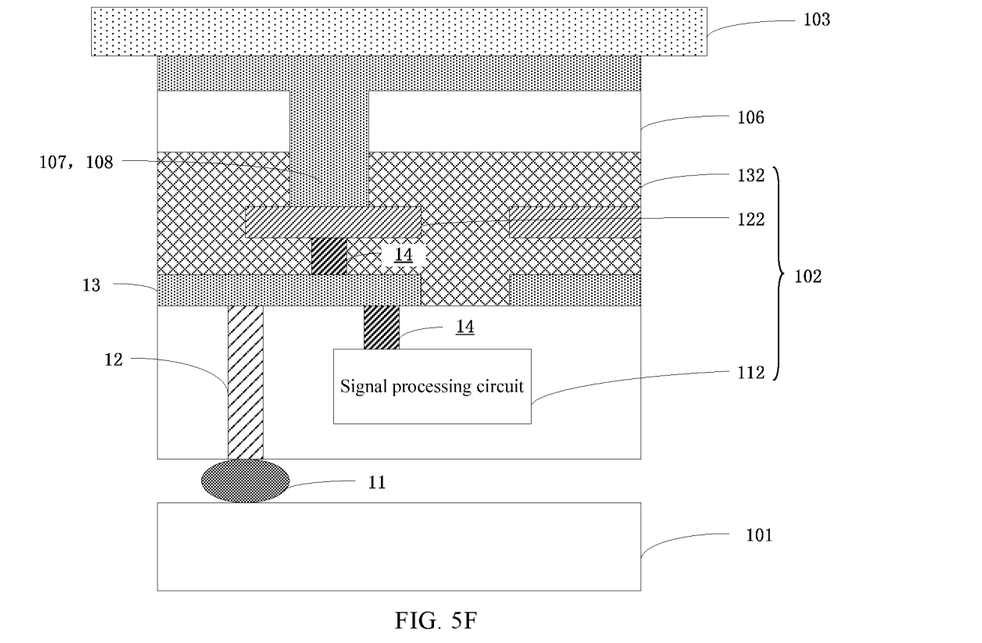

As shown in FIG. 5F, a touch cover plate 103 is formed on the conductive material 108.

In foregoing implementations, the fingerprint recognition apparatus shown in FIG. 1C may be formed. The conductive material is formed between the touch cover plate and the sensing electrodes, and the buffer layer is formed between the touch cover plate and the protection layer, thereby reducing mechanical damage to the fingerprint chip while further improving sensitivity of the fingerprint chip.

FIG. 6A to FIG. 6F are schematic diagrams of stages of another form of a method for manufacturing a fingerprint recognition apparatus such as those described in the present disclosure.

Figure 6A:
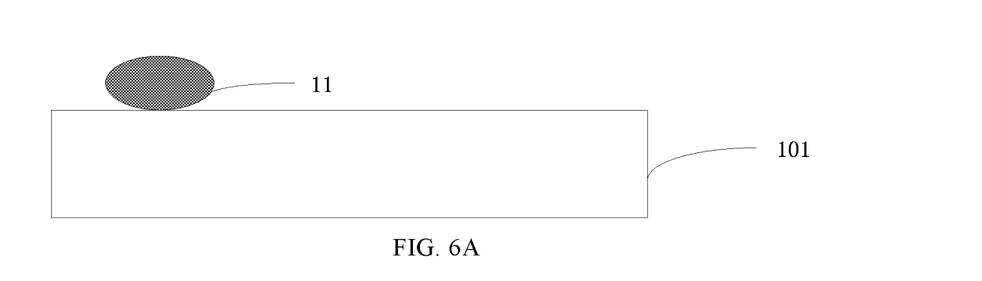

As shown in FIG. 6A, a protrusion 11 is formed on a surface of a substrate 101.

Figure 6B:
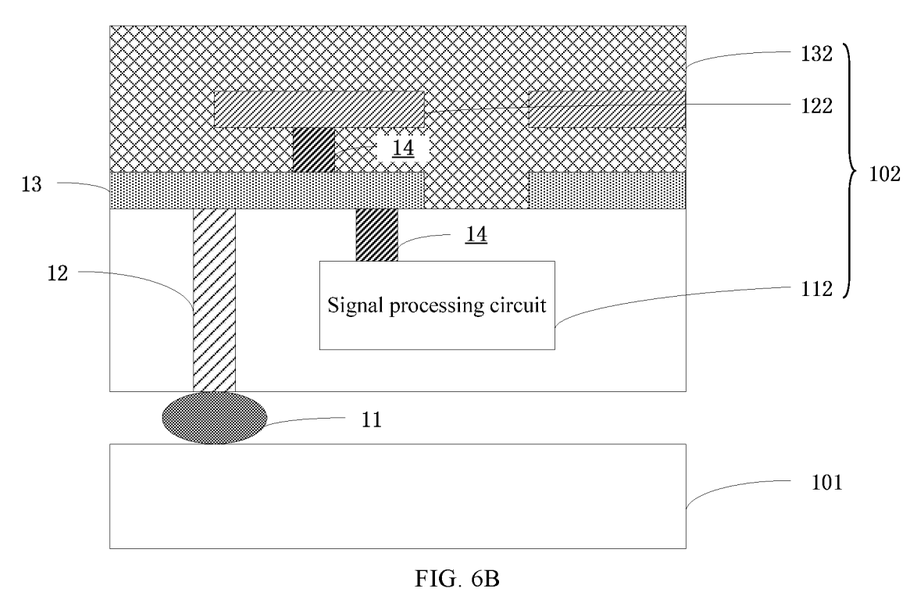

As shown in FIG. 6B, a fingerprint chip 102 is formed. The fingerprint chip 102 includes: a signal processing circuit 112 connected to the protrusion 11 through a TSV structure 12, a plurality of sensing electrodes 122 connected to the signal processing circuit 112, and a protection layer 132 covering the plurality of sensing electrodes 122.

Figure 6C:
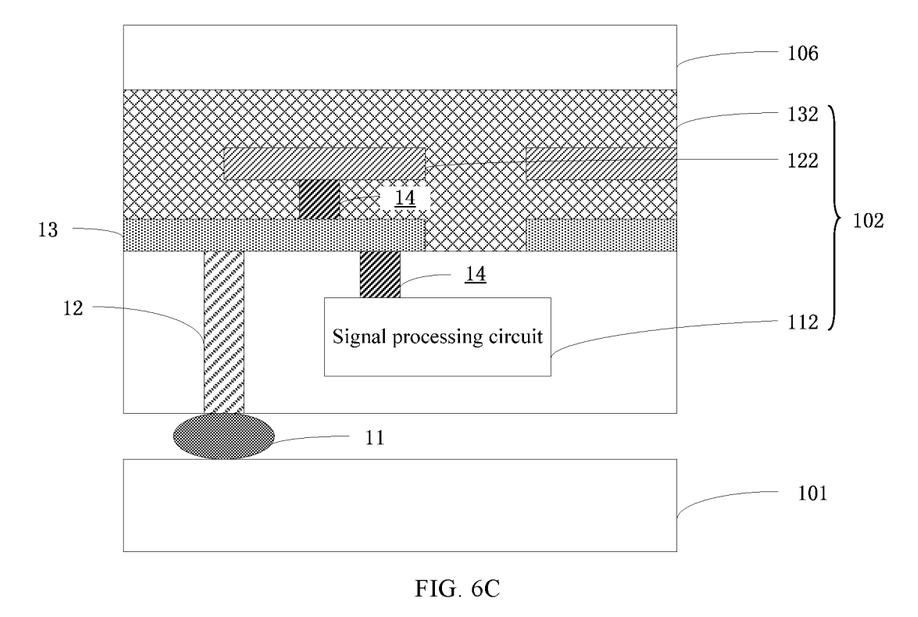

As shown in FIG. 6C, a buffer layer 106 is formed on the protection layer 132.

Figure 6D:
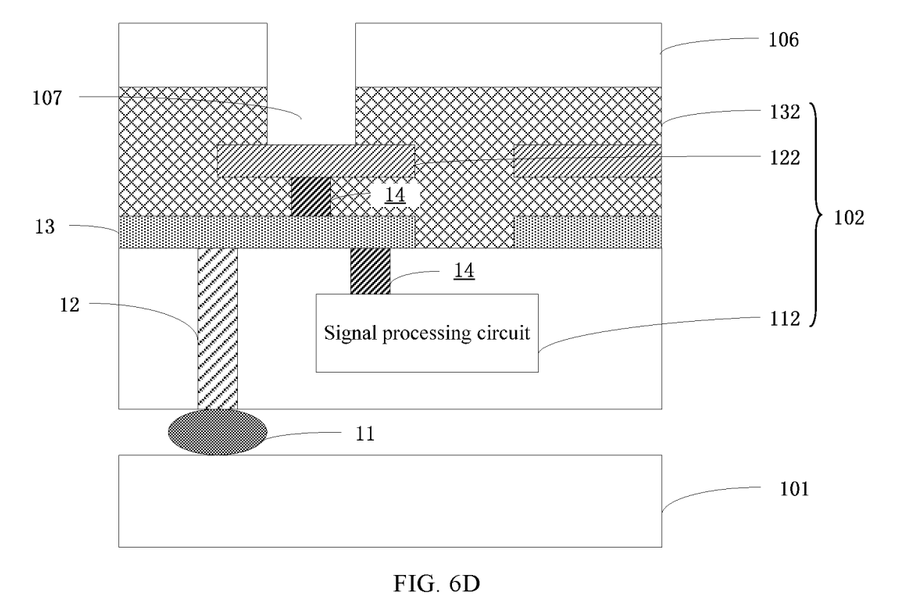

As shown in FIG. 6D, an opening 107 extending from a surface of the buffer layer 106 to each sensing electrode 122 is formed. For example, a patterned mask layer (not shown) may be formed on the buffer layer 106, so as to define the shape of the opening 107. Then, the buffer layer 106 and the protection layer 132 are sequentially etched using the patterned mask layer as a mask and the sensing electrodes 122 as an etch stop layer, so as to form the opening 107.

Figure 6E:
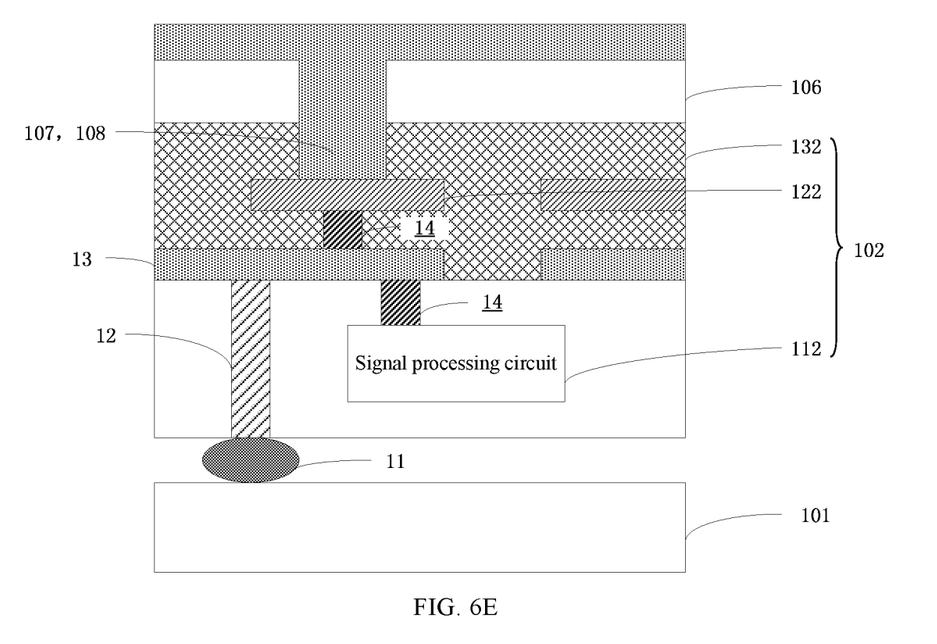

As shown in FIG. 6E, a conductive material 108 filling the opening 107 is formed.

Figure 6F:
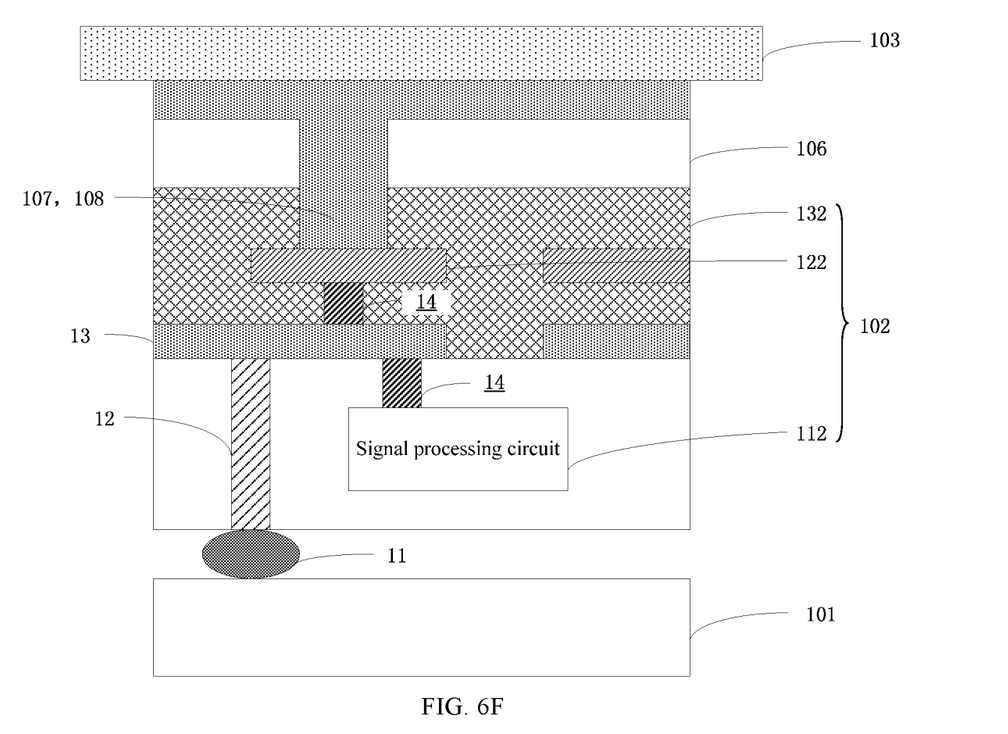

As shown in FIG. 6F, a touch cover plate 103 is formed on the conductive material 108.

In foregoing implementations, the fingerprint recognition apparatus shown in FIG. 1C may also be formed. The conductive material is formed between the touch cover plate and the sensing electrodes, and the buffer layer is formed between the touch cover plate and the protection layer, thereby reducing mechanical damage to the fingerprint chip while further improving sensitivity of the fingerprint chip.

The fingerprint recognition apparatus and the manufacturing method therefor, the mobile terminal, and the fingerprint lock according to embodiments and forms of the present disclosure are described in detail above. To avoid obstructing the concepts of the present disclosure, some details generally known in the art are not described. According to the foregoing descriptions, persons skilled in the art will know how to implement the technical solutions disclosed herein. In addition, the embodiments and implementations disclosed in this specification may be freely combined. Persons skilled in the art will understand that various modifications may be made to the embodiments and implementations described above without departing from the spirit and the scope of the present disclosure limited by the appended claims.

What is claimed is:

1. A fingerprint recognition apparatus, comprising:
a substrate defining a protrusion on a surface of the substrate;
a fingerprint chip, comprising:
a signal processing circuit connected to the protrusion through a through substrate via (TSV) structure;
a plurality of sensing electrodes connected to the signal processing circuit; and
a protection layer covering the plurality of sensing electrodes; and
a touch cover plate located on the protection layer.

2. The apparatus according to claim 1, wherein:
the protection layer has a first opening extending to each sensing electrode of the plurality of sensing electrodes; and
the apparatus further comprises:
a conductive material filling the first opening, wherein the touch cover plate is located on the conductive material filling.

3. The apparatus according to claim 1, further comprising:
a buffer layer located on the protection layer, wherein there is a second opening extending from a surface of the buffer layer to each sensing electrode of the plurality of sensing electrodes; and
a conductive material filling the second opening, wherein the touch cover plate is located on the conductive material filling.

4. The apparatus according to claim 3, wherein the conductive material filling comprises a soft conductive material.

5. The apparatus according to claim 4, wherein the soft conductive material comprises graphite or a conductive silver paste.

6. The apparatus according to claim 3, wherein the buffer layer comprises an organic polymer.

7. A mobile terminal, comprising: the fingerprint recognition apparatus according to claim 1.

8. A fingerprint lock, comprising: the fingerprint recognition apparatus according to claim 1.

9. A method for manufacturing a fingerprint recognition apparatus, comprising: forming a protrusion on a surface of a substrate;
forming a fingerprint chip, wherein the fingerprint chip comprises: a signal processing circuit connected to the protrusion through a through substrate via (TSV) structure; a plurality of sensing electrodes connected to the signal processing circuit;
and a protection layer covering the plurality of sensing electrodes; and forming a touch cover plate on the protection layer.

10. The method according to claim 9, wherein the protection layer has a first opening extending to each sensing electrode of the plurality of sensing electrodes; and
wherein the method further comprises:
before forming a touch cover plate on the protection layer, forming a conductive material filling the first opening, wherein the touch cover plate is formed on the conductive material filling.

11. The method according to claim 9, wherein the protection layer has a first opening extending to each sensing electrode; and
wherein forming a touch cover plate on the protection layer comprises:
forming a buffer layer filling the first opening on the protection layer;

forming a second opening extending from a surface of the buffer layer to each sensing electrode of the plurality of sensing electrodes;

forming a conductive material filling the first opening; and forming the touch cover plate on the conductive material filling.

12. The method according to claim 11, wherein the second opening is in alignment with the first opening.

13. The method according to claim 9, wherein forming a touch cover plate on the protection layer comprises:

forming a buffer layer on the protection layer;

forming an opening extending from a surface of the buffer layer to each sensing electrode of the plurality of sensing electrodes;

forming a conductive material filling the opening; and forming the touch cover plate on the conductive material filling.

14. The method according to claim 11, wherein the conductive material comprises a soft conductive material.

15. The method according to claim 14, wherein the soft conductive material comprises graphite or a conductive silver paste.

16. The method according to claim 11, wherein the buffer layer comprises an organic polymer.

* * * * *